US006950426B2

United States Patent
Abel et al.

(10) Patent No.: US 6,950,426 B2
(45) Date of Patent: Sep. 27, 2005

(54) METHOD AND SYSTEM FOR TRANSMITTING DATA BETWEEN TWO COMMUNICATION DEVICES VIA A PACKET-ORIENTED COMMUNICATION NETWORK

(75) Inventors: Ulrich Abel, Essen (DE); Martin Hoppe, Hamm (DE)

(73) Assignee: Siemens Aktiengesellschaft, Munich (DE)

( * ) Notice: Subject to any disclaimer, the term of this patent is extended or adjusted under 35 U.S.C. 154(b) by 842 days.

(21) Appl. No.: 09/898,354

(22) Filed: Jul. 3, 2001

(65) Prior Publication Data

US 2002/0015481 A1 Feb. 7, 2002

(30) Foreign Application Priority Data

Jul. 3, 2000 (DE) .......................................... 100 32 244

(51) Int. Cl.$^7$ ................................................. H04J 3/16
(52) U.S. Cl. ...................................... 370/352; 370/466
(58) Field of Search ................................ 370/401, 402, 370/403, 404, 405, 466, 467, 352, 354, 356

(56) References Cited

U.S. PATENT DOCUMENTS

| 6,134,235 A | * | 10/2000 | Goldman et al. | ........... 370/352 |
| 6,453,034 B1 | * | 9/2002 | Donovan et al. | ...... 379/220.01 |
| 6,584,094 B2 | * | 6/2003 | Maroulis et al. | ............ 370/352 |
| 6,680,952 B1 | * | 1/2004 | Berg et al. | ................... 370/467 |
| 2001/0036173 A1 | * | 11/2001 | Shmulevich et al. | ....... 370/352 |

OTHER PUBLICATIONS

Produktschrift der Firma Siemens AG "Hicom 300 Networking", 1991.
Produktschrift—Sonderausgabe telcom report und Siemens Magazin Com: ISDN in Buro—"HICOM" Siemens AG pp. 14–31.

* cited by examiner

*Primary Examiner*—Chau Nguyen
*Assistant Examiner*—Blanche Wong
(74) *Attorney, Agent, or Firm*—Bell Boyd & Lloyd LLC

(57) ABSTRACT

A method and system for transmitting data between two communication devices via a packet-oriented communication network, wherein the communication devices are, in each case, connected to the packet-oriented communication network via a conversion device. Time-slot-oriented signaling and user information allocated to a connection between the communication devices are separated at the transmitter end by the conversion devices. The signaling information is then transmitted transparently via a first link via the packet-oriented communication network. The user information is converted into a data format supported by the packet-oriented communication network for transmission via the packet-oriented communication network and is then transmitted via a second connection. Finally, the user information is converted back at the receiver end and joined together with the signaling information.

9 Claims, 2 Drawing Sheets

METHOD AND SYSTEM FOR TRANSMITTING DATA BETWEEN TWO COMMUNICATION DEVICES VIA A PACKET-ORIENTED COMMUNICATION NETWORK

BACKGROUND OF THE INVENTION

1. Field of the Invention

The present invention relates to both a method and a system for providing features throughout a network which are supported by private branch exchanges via a packet-oriented (particularly an IP (Internet Protocol) oriented) communication network.

2. Description of the Prior Art

From the product document "Sonderausgabe telcom report und Siemens Magazin Corn: ISDN im Büro—HICOM" [Special addition telecom report and Siemens magazine Corn: ISDN in the office—HICOM] Siemens AG, Berlin and Munich, 1985, especially pages 14 to 31, a private branch exchange constructed for switching information, especially for switching voice data, is known which supports a multiplicity of features such as, for example, automatic callback, call acceptance, call diversion etc. Furthermore, it is known from the product document by Siemens AG "HICOM 300 Networking", 1991, order number A3 1001-W-A30 to connect private branch exchanges together to form one communication network which, as a rule, is private, and to provide throughout the network features available locally at a private branch exchange.

As a rule, the private branch exchanges are connected to one another via proprietary or standardized time-slot-oriented interfaces, such as an ISDN-oriented $S_0$ or $S_{2m}$ interface. Accordingly, proprietary signaling protocols or standardized signaling protocols such as, for example, QSIG (Q Interface Signaling Protocol) or the ISDN-oriented signaling protocol DSS1 (Digital Subscriber System No. 1) are used for signaling the features between the private branch exchanges.

In modern communication systems, private branch exchanges are increasingly connected to one another via computer networks; e.g., a LAN (Local Area Network). As a rule, data are transmitted via these computer networks in accordance with the known packet-oriented IP (Internet Protocol). A known standard based on the IP protocol for transmitting voice, data and video communication is the H.323 protocol standardized by the ITU-T (International Telecommunication Union—Telecommunications).

To provide throughout the network the features supported by a private branch exchange via a computer network, it is necessary to convert the existing signaling protocols based on a time-slot-oriented data transmission for packet-oriented data transmission. As a rule, such a conversion is carried out by special converting devices, frequently called gateways, which must be specially adapted to the respective signaling protocol used by a private branch exchange and must be updated with each expansion of the signaling protocol. In addition, only a limited number of features are defined in the IP protocol or, respectively, the H.323 protocols that is not possible to provide throughout the network all features supported locally by a private branch exchange via a computer network supporting these protocols.

The present invention is therefore directed toward certain measures by which, throughout the network of features provided locally by a private branch exchange, a provision is made possible by a computer network.

SUMMARY OF THE INVENTION

An advantage of both the method and system to the present invention is that all features supported by a private branch exchange can be made available throughout the network by separate transparent transmission of signaling information via the computer network wherein it is no longer necessary to adapt the conversion device to the signaling protocol currently used.

An advantage of certain embodiments of the present invention is that, among other things, the system and network resources needed for the signaling can be kept low by using a common signaling link for a number of user data connections.

A further advantage of certain embodiments of the present invention is that it is possible to join and synchronize the signaling and user information transmitted separately via the computer network in a simple manner at the receiver end by using a respective identification unambiguously allocated to the different virtual access ports of a conversion device.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
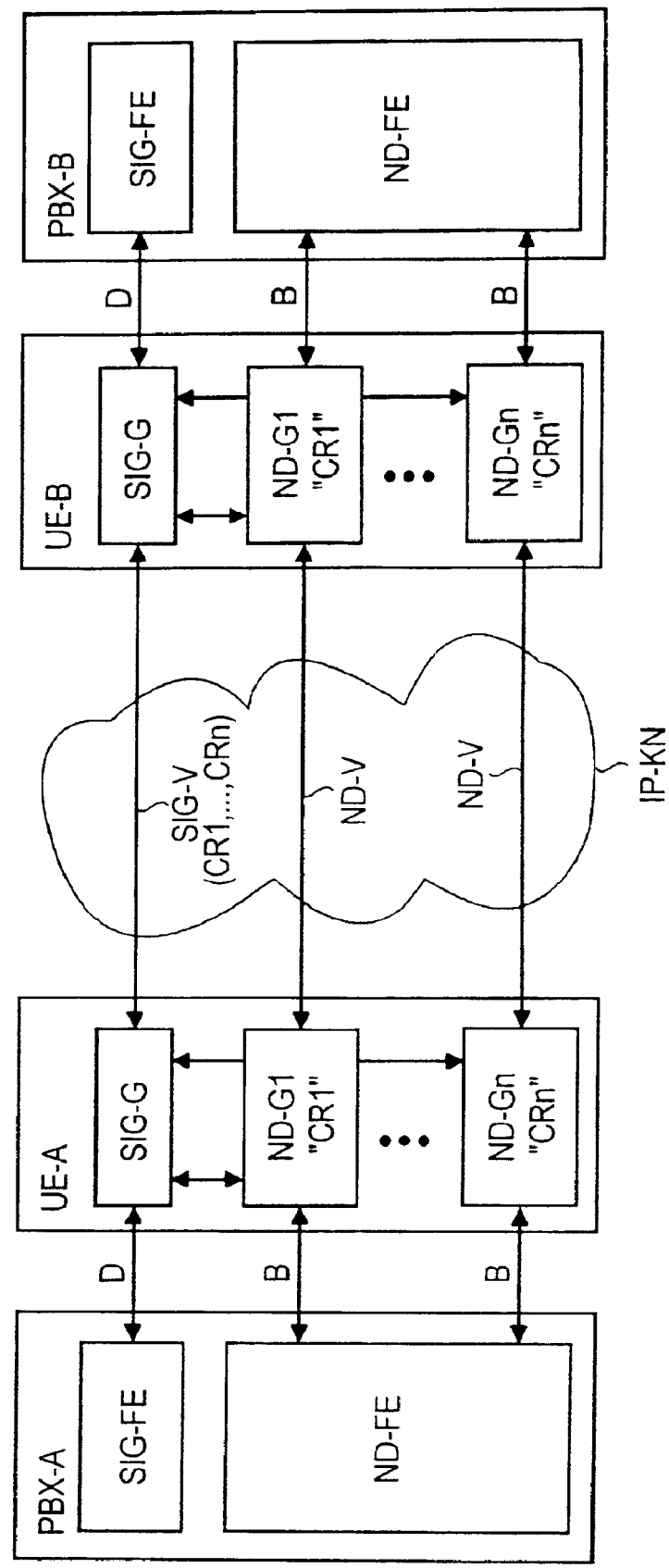
FIG. 1 shows a structural diagram for the diagrammatic representation of the functional units of the system according to the present invention.

FIG. 1 shows a structural diagram for the diagrammatic representation of a first private branch exchange PBX-A and a second private branch exchange PBX-B which are, in each case, connected to a computer network IP-KN via a conversion device UE-A, UE-B, frequently called gateway in the literature. Both the first and the second private branch exchange PBX-A, PBX-B exhibit a functional unit SIG-FE controlling the signaling of the private branch exchange PBX-A, PBX-B, (for example a central controller) and a functional unit ND-FE, (for example a switching network) controlling the transmission of user data of the private branch exchange PBX-A, PBX-B.

The functional unit SIG-FE controlling the signaling of the private branch exchange PBX-A, PBX-B is, in each case, connected to a signaling gateway SIG-G of the respective conversion device UE-A, UE-B via a signaling link D, consisting, for example, of one or more ISDN-oriented D channels. The functional unit ND-FE controlling the transmission of user data of the private branch exchange PBX-A, PBX-B is, in each case, connected to n virtual user data gateways ND-G1, ..., ND-Gn of the respective conversion device UE-A, UE-B via n user data connections B; for example, in each case, one or more ISDN-oriented B channels. For addressing the virtual user data gateways ND-G1, ..., ND-GN, these are, in each case, allocated an identification CR1, ..., CRn (represented in inverted commas) which is unambiguous for the respective conversion device UE-A, UE-B.

The signaling and user information to be transmitted in a connection between the first and second private branch exchange PBX-A, PBX-B is transmitted, according to the present invention, by separate connections via the computer network IP-KN. The signaling information to be transmitted is transmitted via a signaling link SIG-V between the signaling gateways SIG-G of the first and the second conversion devices UE-A, UE-B. The user information is transmitted via a user data connection ND-V between the user data gateways ND-G1, ..., ND-Gn of the first and second conversion devices UE-A, UE-B. In this arrangement, signaling information allocated to different user data connections ND-V is transmitted jointly via the signaling link SIG-V, illustrated by CR1, ..., CRn set in brackets.

The user information is transmitted via the user data connection ND-V in accordance with the transmission protocol supported by the computer network IP-KN. For example, voice data can be transmitted in accordance with the known H.323 protocol. For this purpose, the user information is converted at the transmitter end by the respective user data gateway ND-G1, ..., ND-Gn from the time-slot-oriented (for example, the ISDN-oriented) data format supported by the private branch exchange PBX-A, PBX-B, into the packet-oriented (for example, the H.323-orientated) data format supported by the computer network IP-KN and transmitted via the computer network IP-KN. At the receiver end, the user information formatted in accordance with the H.323 data format is converted back into the time-slot-oriented data format supported by the private branch exchange PBX-A, PBX-B in the corresponding user data gateway ND-G1, ..., ND-Gn and transmitted to the private branch exchange PBX-A, PBX-B. In contrast to the user information, the signaling information is transmitted transparently via the signaling link SIG-V. In the literature, this is frequently referred to as the signaling formation being transmitted "tunneled" by the IP protocol.

Figure 2:
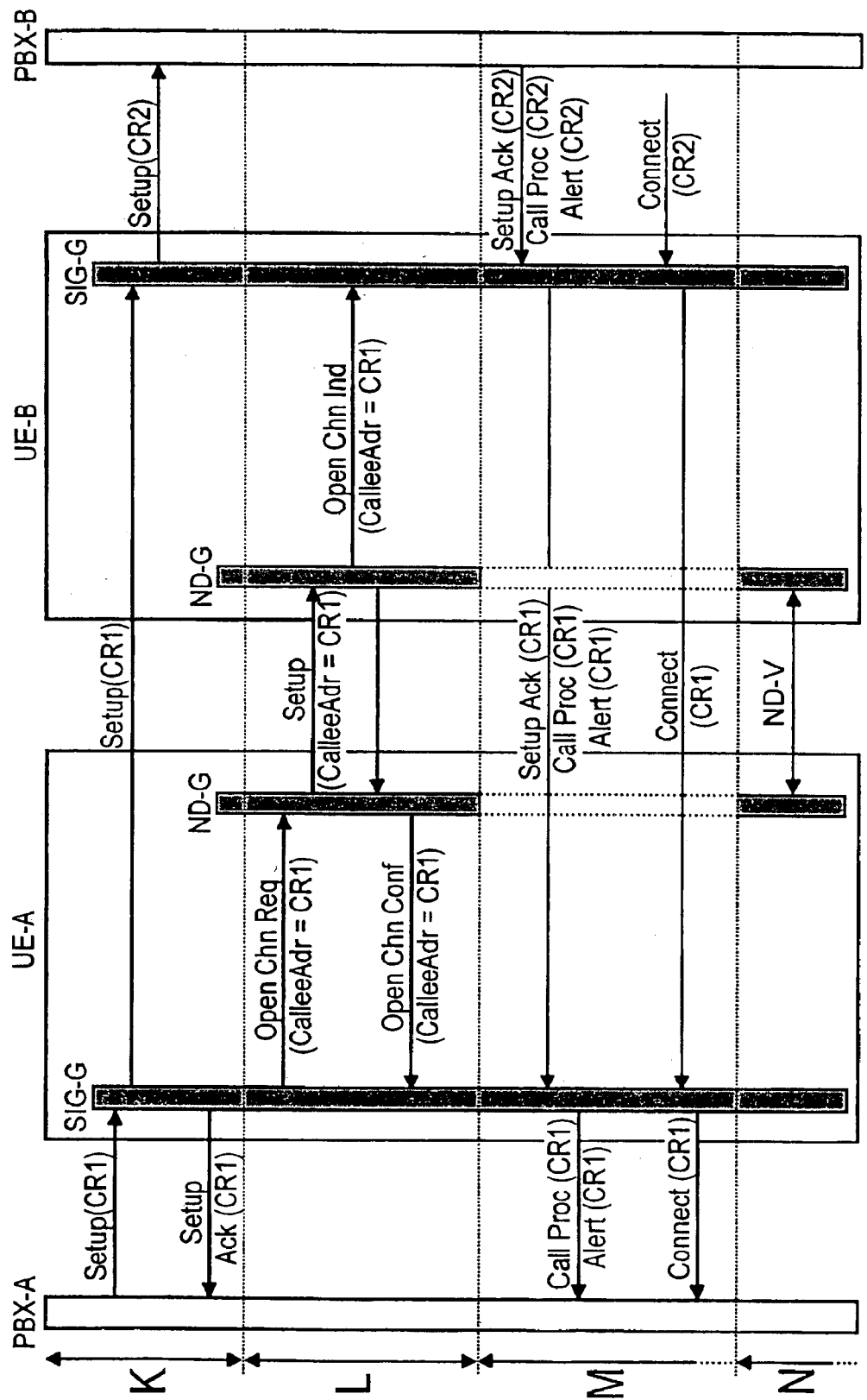
FIG. 2 shows a flowchart illustrating the messages to be transmitted between the functional units during the setting-up of a connection of the present invention.

FIG. 2 then shows a flowchart illustrating the messages to be transmitted, according to the method of the present invention, during the setting-up of a connection from the first private branch exchange PBX-A to the second private branch exchange PBX-B.

In a first phase, identified by K in FIG. 2, the connection set-up from the first private branch exchange PBX-A to the second private branch exchange PBX-B is initialized; for example, by a call number input at the first private branch exchange PBX-A. For this purpose, a connection setup message "Setup (CR1)" containing an identification CR1 is transmitted from the first private branch exchange PBX-A to the signaling gateway SIG-G of the first conversion device UE-A. The identification CR1 is dynamically allocated to the connection setup message "Setup (CR1)" by the first private branch exchange PBX-A; i.e., for example, the first free identification CR1, . . . CRn is selected by the first private branch exchange PBX-A and allocated to the connection setup message "Setup (CR1)".

In a next step, the first conversion device UE-A determines the network address (for example, an IP address) allocated to the second conversion device UE-B in the IP-oriented communication network IP-KN. Using the network address determined, a second connection setup message "Setup (CR1)" also containing the identification CR1 is transmitted from the signaling gateway SIG-G of the first conversion device UE-A via the computer network IP-KN to the signaling gateway SIG-G of the second conversion device UE-B. The network address can be determined via a table (not shown) stored in the first conversion device UE-A in which the network address of the second conversion device UE-B is stored allocated to the call number of the second private branch exchange PBX-B. As an alternative, the network address can be determined by an external data processing device (frequently called "call address resolution server" in the literature) connected to the first conversion device UE-A or the first private branch exchange PBX-A. After that, a response message "Setup Ack (CR1)" acknowledging the connection setup message "Setup (CR1)" is transmitted to the first private branch exchange PBX-A by the signaling gateway SIG-G of the first conversion device UE-A.

On the basis of the second connection setup message "Setup (CR1)" received, a third connection setup message "Setup (CR2)" is transmitted to the second private branch exchange PBX-B by the signaling gateway SIG-G of the second conversion device UE-B. The identification CR2 contained in the third connection setup message "Setup (CR2)" is again dynamically allocated to the third connection setup message "Setup (CR2)"; i.e., the first free identification CR1, . . . , CRn is selected by the second conversion device UE-B and allocated to the third connection setup message "Setup (CR2)".

In a second phase, identified by L in FIG. 2, the setting-up of a user data connection ND-V (particularly a connection based on the H.323 protocol for transmitting voice data) is initialized from the first private branch exchange PBX-A to the second private branch exchange PBX-B. For this purpose, a channel request message "Open Chn Req (CalleeAdr=CR1)" is transmitted to the corresponding user data gateway ND-G in the first conversion device UE-A emanating from the signaling gateway SIG-G. The parameter CalleeAdr also transmitted in the channel request message "Open Chn Reg (CalleeAdr=Cr1)" is an internal parameter of the message defined in the H.323 protocol and is used as call destination address in this context. For subsequent synchronization of the user data connection ND-V with the corresponding signaling information transmitted via the signaling link SIG-V, the parameter CalleeAdr is occupied according to the present invention by the identification CR1 already contained in the setup message "Setup (CR1)".

In a next step, the network address allocated to the corresponding user data gateway ND-G of the second conversion device UE-B in the computer network IP-KN is determined by the first conversion device UE-A. Using the network address determined, a corresponding connection setup message "Setup (CalleeAdr=CR1)" is transmitted to the corresponding user data gateway ND-G of the second conversion device UE-B by the user data gateway ND-G of the first conversion device UE-A via the computer network IP-KN. In this process, the network address can be determined again by a table (not shown) stored in the first conversion device UE-A, in which a network address allocated to the identification CR1 is stored. As an alternative, the network address can be determined again by an external data processing device.

After that, a message "Open Chn Ind (CalleeAdr=CR1)" indicating the setting up of the user data connection ND-V is transmitted to the signaling gateway SIG-G of the second conversion device UE-B by the user data gateway ND-G of the second conversion device UE-B. In addition, a response message acknowledging the connection setup message "Setup (CalleeAdr=CR1)" is transmitted back to the user data gateway ND-G of the first conversion device UE-A which then sends a channel request confirmation message "Open Chn Conf (CalleeAdr=CR1)" to the signaling gateway SIG-G of the first conversion device UE-A.

During a third phase, identified by M in FIG. 2, a signaling link SIG-V exists for transparent transmission of signaling information between the signaling gateways SIG-G of the first and the second conversion devices UE-A, UE-B. A message received at the signaling gateway SIG-G of the second conversion device UE-B is appropriately converted by the signaling gateway SIG-G and transmitted to the signaling gateway SIG-G of the first conversion device UE-A via the signaling link SIG-V. The signaling gateway SIG-G of the first conversion device UE-A then forwards a corresponding message, as necessary, to the first private branch exchange PBX-A. By way of example, a message "Setup Ack (CR2)" acknowledging the third connection setup message "Setup (CR2)" is represented which is appropriately converted by the signaling gateway SIG-G and is transmitted in the form of the message "Setup Ack (CR1)" via the signaling link SIG-V to the signaling gateway SIG-G of the first conversion device UE-A. In addition, connection setup messages "Call Proc (CR2)" and "Alert (CR2)" are shown which signal that the information necessary for setting up a call has completely arrived or, respectively, that call signaling is taking place at the second private branch exchange PBX-B. These connection setup messages are appropriately converted by the signaling gateway SIG-G of the second conversion device UE-B, transmitted via the signaling link SIG-V to the signaling gateway SIG-G of the first conversion device UE-A and forwarded by the latter into the first private branch exchange PBX-A in the form of the connection setup messages "Call Proc (CR1)" and "Alert (CR1)".

Furthermore, a connection message "Connect (CR2)" which indicates the acceptance of the connection by the second private branch exchange PBX-B and which is received at the signaling gateway SIG-G of the second conversion device UE-B is appropriately converted by the signaling gateway SIG-G and transmitted in the form of a connection message "Connect (CR1)" via the signaling link SIG-V to the signaling gateway SIG-G of the first conversion device UE-A. The signaling gateway SIG-G of the first conversion device UE-A thereupon forwards a corresponding connection message "Connect (CR1)" to the first private branch exchange PBX-A.

In this process, the signaling information is transmitted transparently via the signaling link SIG-V; i.e., the signaling messages are transmitted tunneled via the IP protocol. In this manner, the features provided locally by one of the private branch exchanges PBX-A, PBX-B can be provided throughout the network in the computer network IP-KN since conversion of the time-slot-oriented signaling information into the protocol supported by the computer network IP-KN is unnecessary. In this manner, independence of the features supported by the respective packet-oriented protocol, e.g. the H.323 protocol, is achieved.

During a fourth phase, identified by N in FIG. 2, a user data connection ND-V then exists for transmitting user information between the user data gateways ND-G of the first and second conversion devices UE-A, UE-B. In this process, the user information sent by one of the private branch exchanges PBX-A, PBX-B and received at one of the conversion devices UE-A, UE-B is converted into the data format supported by the computer network IP-KN, for example into the H.323 data format, and then transmitted via the user data connection ND-V. Using standardized transmission protocols, such as, e.g., the H.323 protocol, for transmitting the user information ensures protected data transmission.

In the private branch exchanges PBX-A, PBX-B, synchronization of the user data connection ND-V and the corresponding signaling information transmitted via the signaling link SIG-V is possible in a simple manner at the receiver end by using the identification CR1, . . . , CRn in the signaling link SIG-V and using the parameter CalleeAdr, which is identical, for identifying CR1, . . . , CRn, in the user data connection ND-V.

Although the present invention has been described with reference to specific embodiments, those of skill in the art will recognize that changes may be made thereto without departing from the spirit and scope of the invention as set forth in the hereafter appended claims.

We claim:

1. A method for transmitting data between two communication devices via a packet-oriented communication network, the method comprising the steps of:
   separating time-slot-oriented signaling and user information allocate to a connection at a transmitter end;
   setting up a first link for transmitting the signaling information;
   setting up a second connection for transmitting the user information;
   transmitting the signaling information transparently via the first link;
   converting the user information into a data format supported by the packet-oriented communication network for transmission via the second connection;
   transmitting the user information via the second connection;
   converting the user information back at a receiver end; and
   joining the user information to the signaling information.

2. A method for transmitting data between two communication devices via a packet-oriented communication network as claimed in claim 1, wherein for a plurality of second connections, only one first link common to the second connections is set up.

3. A method for transmitting data between two communication devices via a packet-oriented communication network as claimed in claim 1, wherein the user information and the signaling information are joined together via an identification transmitted via the first link and the associated second connection.

4. A method for transmitting data between two communication devices via a packet-oriented communication network as claimed in claim 3, wherein the user information and signaling information items having the same identifications are joined together.

5. A method for transmitting data between two communication devices via a packet-oriented communication network as claimed in claim 3, wherein a virtual access port of a conversion device implementing the connection of the communication device to the packet-oriented communication network is identified by the identification.

6. A method for transmitting data between two communication devices via a packet-oriented communication network as claimed in claim 1, wherein the second connection is set up in accordance with the H.323 protocol.

7. A system for transmitting data between two communication devices, comprising:
   a first communication device;
   a second communication device;
   a packet-oriented communication network connecting the first and second communication devices for the transmission of data therebetween; and
   first and second conversion devices respectively associated with the first and second communication devices for respectively connecting the first and second communication devices to the packet-oriented communication network;

wherein the first and second conversion devices are designed such that time-slot-oriented signaling and user information allocated to a communication connection between the first and second communication devices are separated at a transmitter end, a first link is set up for transmitting the signaling information and a second connection is set up for transmitting the user information, the signaling information is transmitted transparently via the first link and the user information is converted into a data format supported by the packet-oriented communication network for transmission via the second connection and then is transmitted, and the user information is converted back at a receiver end and is joined to the signaling information.

8. A system for transmitting data between two communication devices as claimed in claim 7, wherein each conversion device has a plurality of virtual access ports for connection to the packet-oriented communication network, d an unambiguous identification is allocated to each virtual access port.

9. A system for transmitting data between two communication devices as claimed in claim 7, wherein an identification is respectively allocated to the first link and second connection, and the user information and the signaling information are joined together via the identifications respectively allocated.

* * * * *